United States Patent
Josset (10) Patent No.: US 7,516,604 B2
(45) Date of Patent: Apr. 14, 2009

(54) TAKE UP ARRANGEMENT WITH A POSITION OF THE TINE CARRIERS DEPENDENT UPON THE DIRECTION OF ROTATION

(75) Inventor: Etienne Josset, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/057,641

(22) Filed: Mar. 28, 2008

(65) Prior Publication Data

US 2008/0236128 A1 Oct. 2, 2008

(30) Foreign Application Priority Data

Mar. 29, 2007 (DE) .................. 10 2007 015 101

(51) Int. Cl.
*A01D 80/00* (2006.01)
(52) U.S. Cl. ...................................... 56/364
(58) Field of Classification Search ............. 56/364, 56/341, 372, 219; 100/100, 173
See application file for complete search history.

(56) References Cited

U.S. PATENT DOCUMENTS

| | | | | |
|---|---|---|---|---|
| 2,527,887 A | * | 10/1950 | Martin | 56/364 |
| 2,682,743 A | * | 7/1954 | Hintz | 56/364 |
| 3,613,345 A | * | 10/1971 | Cofer | 56/364 |
| 3,713,283 A | * | 1/1973 | Fritz | 56/364 |
| 4,161,859 A | * | 7/1979 | Storm et al. | 56/364 |
| 4,297,833 A | * | 11/1981 | Gaeddert | 56/364 |
| 4,524,576 A | * | 6/1985 | Probst | 56/372 |
| 4,929,904 A | * | 5/1990 | Bohman et al. | 324/696 |
| 5,052,171 A | * | 10/1991 | Bich et al. | 56/364 |
| 5,394,682 A | * | 3/1995 | Frimml et al. | 56/341 |
| 5,426,928 A | * | 6/1995 | Frimml et al. | 56/341 |
| 5,842,335 A | * | 12/1998 | Esau | 56/341 |
| 2006/0242937 A1 | * | 11/2006 | Pourchet et al. | 56/219 |

* cited by examiner

*Primary Examiner*—Árpád Fábián Kovács

(57) ABSTRACT

The crop take-up arrangement includes a take-up rotor having several tine carriers with tines fastened to it that can be moved along a circular track, supported, free to rotate, about their axes of rotation. A housing contains the take-up rotor with strippers between which elongated intervening spaces remain through which the radially outer regions of the tines extend outward over a part of the circular track of the tine carriers. A drive shaft can be driven in two directions of rotation to drive the tine carriers around the circular track. It is proposed that the tine carriers be supported in bearings so as to pivot about their longitudinal axes between two end positions and be able to move between the end position as a function of the direction of rotation of the drive shaft.

7 Claims, 7 Drawing Sheets

TAKE UP ARRANGEMENT WITH A POSITION OF THE TINE CARRIERS DEPENDENT UPON THE DIRECTION OF ROTATION

FIELD OF THE INVENTION

The invention concerns a crop take-up arrangement with a take-up rotor that includes several tine carriers that can be moved along a circular track and are supported so as to rotate about their longitudinal axis with tines attached thereto. A housing encloses the take-up rotor with strippers between which elongated spacing intervals remain and through which the radially outer areas of the tines project outward over one part of the circular track of the tine carriers. A drive shaft can be driven in two directions of rotation and is used to drive the tine carriers along the circular track.

BACKGROUND OF THE INVENTION

Crop take-up arrangements are used in agriculture in order to take up crop lying on a field which, as a rule, had previously been dried and deposited in a swath, and to conduct it to a harvesting machine in which it can be compressed into a bale (balers), if necessary after a cutting process, deposited for transportation (self-loading forage box), chopped (forage harvester), or threshed out (combine). Take-up arrangements of this kind typically include tines, extending transverse to the direction of operation, attached to tine carriers. The tine carriers are brought into movement when a retainer supporting them is brought into rotation. The tines extend outward into intervening spaces that remain between strippers fastened to the frame of the crop take-up arrangement, and move along these intervening spaces. The tine carriers can be controlled by curved or cam tracks as, for example, disclosed in U.S. Pat. No. 2,388,212, so that the angular position of the tine carriers varies during their rotation in order to take up the harvested crop as aggressively as possible and in order to be able to retract into the interior space of the strippers at the delivery point, or they are not controlled, that is, they are rigidly connected to the retainer as disclosed in EP 0 903 077 A.

After a jam in the flow of the crop it is desirable to reverse the take-up arrangement, that is, to drive it in a direction opposite to the normal direction of the take-up operation. However typical take-up arrangements cannot be reversed, since the tines would become entangled with the housing. DE 102005020463A proposes that a guide arrangement be provided in the rear region of the tines which guides the tines into the intervening spaces between the strippers upon a reversal of the take-up rotor. Here the choice of the angle of the tines at the delivery point of the harvested crop is problematic, during conveying that angle should be as large as possible, but it should be as small as possible during any reverse operation. Analogously, problems occur on occasion at the point of entry of the tines at the rear, lower end of the housing during any reverse operation, since at that location an orientation of the tines as close as possible to the vertical direction of the strippers is desirable. However, such an angle is not optimum during the harvesting operation.

DE 4425142C describes a conveyor drum with a shaft supported in bearings located eccentrically to the axis of the conveyor drum, several fingers are supported in bearings on the shaft and extend through associated openings in the conveyor drum. The drum is driven in rotation. Since the shaft is supported in bearings, free to rotate in a region of rotation, it moves between two end positions on the basis of the forces applied to the fingers. The result is that the crankshaft reaches its one end position upon a first direction of rotation of the drum, and the fingers project relatively far out of the housing and actively convey the harvested crop. If the drum is reversed, the crankshaft rotates into its other end position and the fingers actively convey the harvested crop along.

SUMMARY OF THE INVENTION

An object underlying the invention is seen in the need to define a crop take-up arrangement with a rotor that can be reversed without any problems and yet permits an appropriate angular position of the tines in conveying as well as in reverse operation.

A crop take-up arrangement includes a take-up rotor with several tine carriers, that can move along a circular track at an offset angle, each of which retains several tines. The take-up rotor is arranged inside a housing that is provided with several strippers on the forward side of the take-up arrangement, as seen in the forward operating direction, elongated intermediate spaces remain between the strippers through which the tines project when the tine carriers are in the forward part of their circular track. A drive shaft drives the tine carriers selectively in a first or a second direction of rotation. The tine carriers are supported in bearings so as to pivot about their longitudinal axis within a limited angular range. They are moved between their end positions as a function of the direction of rotation of the drive shaft.

Each of the end positions corresponds to angles of the tine carriers that are appropriate in the first direction of rotation for the conveying of the harvested crop and in the second direction permit a reversing of the take-up rotor without any problems. They are accepted as a function of the direction of rotation of the drive shaft, this can occur in various ways.

In one embodiment an appropriate mechanism is provided between the drive shaft and the tine carriers that transmits the rotational movement of the drive shaft to the tine carriers and brings the latter into the desired position as a function of the direction of rotation. A separate drive could also be used to pivot the tine carrier as a function of the direction of rotation.

In another preferred embodiment the tine carriers are supported in bearings, free to pivot, about their longitudinal axes within the limited range of angles between their two end positions, and are moved between their end positions by forces acting on the tines. In this way the result is that the angular position of the tine carriers is a function of the direction of rotation of the drive shaft since the inertia forces and the harvested crop interacting with the tines in each case forces the tine carriers to the rear opposite to the direction of rotation.

The end positions can be defined by one or more cams or stops that are connected directly or indirectly with retainers on which the tine carriers are supported in bearing, free to rotate, and with which the drive shaft is connected so as to drive. An indirect connection can be attained by attaching the cams to a central shaft connecting two retainers of the tine carriers.

Moreover devices can be provided for the connection of the tine carriers among each other that couple their rotational movements about the longitudinal axes. For that purpose a freely rotating coupling ring is provided that is connected by an element so as to drive the tine carriers which interacts with a slot or an elongated hole in the coupling ring. The element is connected to the tine carrier or is part of the tine carrier. The element can, for example, be formed by a pin that interacts with the slot or elongated hole in the coupling ring. In this way the coupling ring can limit the rotational movement of the tine carriers at least in one direction of rotation.

In a preferred embodiment the take-up rotor conveys in an overshot manner in a first direction of rotation of the drive shaft which is used during the harvesting operation. Here the tines are oriented at least approximately vertically to the areas of the strippers in that region at the upper, rear end of the elongated intervening spaces. During the second direction of rotation of the drive shaft the tines are oriented at least approximately vertically to the region of strippers in that area at the lower, rear end of the elongated intervening spaces. Thereby an entry of the tines into the housing without any problems is possible during reverse operation without the danger that harvested crop becomes jammed between the tines and the strippers.

The crop take-up arrangement according to the invention can be applied to any agricultural harvesting machine, for example, forage harvesters, self-loading forage boxes, combines or balers.

DESCRIPTION OF THE PREFERRED EMBODIMENT

Figure 1:
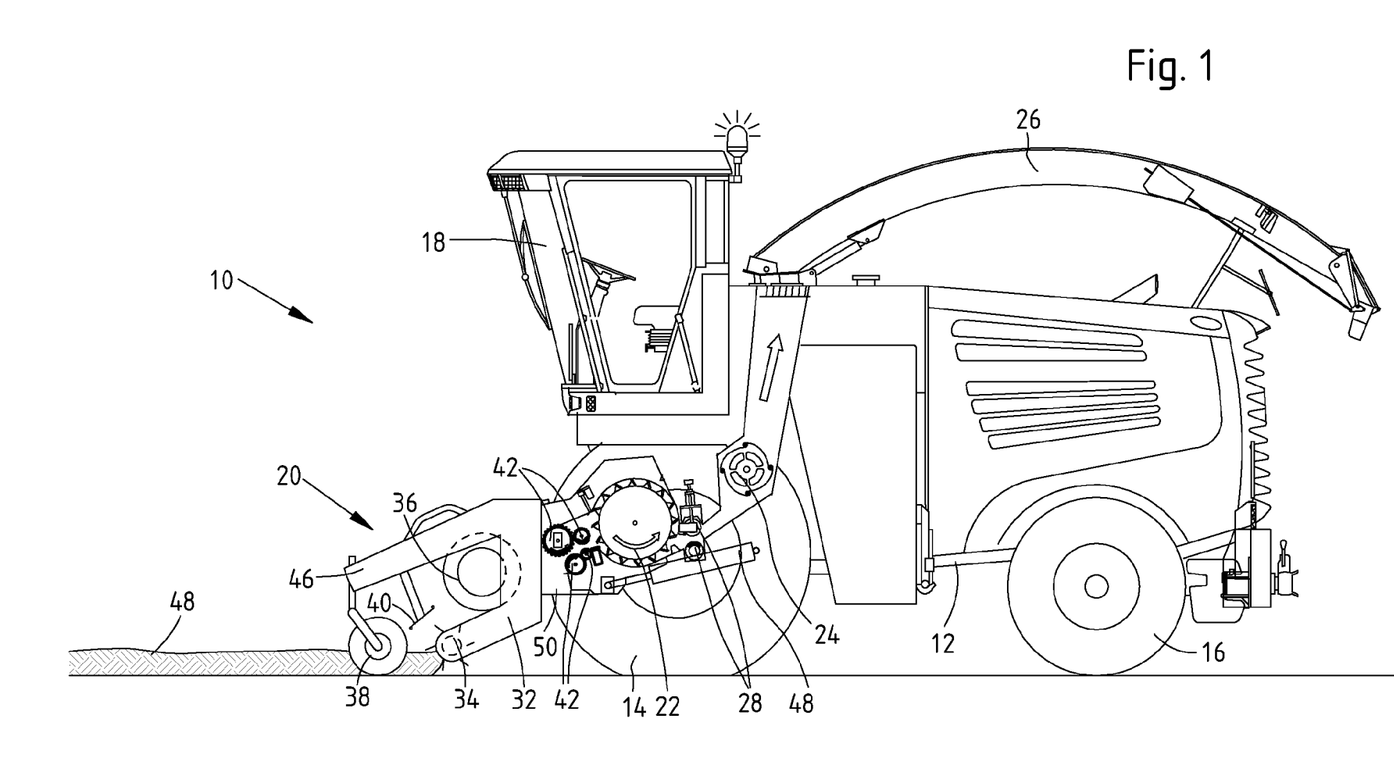
FIG. 1 shows a side view of a forage harvester with a crop take-up arrangement.

FIG. 1 shows a harvesting machine 10 in the form of a self-propelled forage harvester. The harvesting machine 10 is supported on a frame 12 carried by driven front wheels 14 and steerable rear wheels 16. The harvesting machine 10 is controlled from an operator's cab 18 from which a front harvesting attachment in the form of a crop take-up arrangement 20 can be controlled visually. Harvested crop taken up from the ground by means of the crop take-up arrangement 20, for example, grass or the like, is conducted over an intake conveyor 42 with pre-pressing rolls arranged within an intake housing 50 on the front side of the forage harvester 10 and is conducted to a chopper drum 22 that chops the crop into small pieces and delivers it to a conveyor arrangement 24. The crop leaves the harvesting machine 10 to an accompanying trailer over a discharge duct 26 that can be rotated about an approximately vertical axis and can be adjusted in its inclination. A post chopper reduction arrangement 28 extends between the chopper drum 22 and the conveyor arrangement 24, it includes two kernel processor rolls by means of which the crop to be conveyed is conducted tangentially to the conveyor arrangement 24.

The crop take-up arrangement 20 is configured as a so-called pick-up. The crop take-up arrangement 20 is built up on a housing 32 and is supported on the ground by means of support wheels 38 attached to both sides which are fastened to the housing 32 by means of a carrier 46 on each side. The purpose of the crop take-up arrangement 20 consists of taking up harvested crop from the ground that was scattered across a field or deposited in a swath 48, and to conduct it to the harvesting machine 10 for further processing. For this purpose the take-up arrangement 20 is moved over the field at a small spacing from the ground during the harvesting operation, while for transportation on public roads or on paths it is raised by means of a hydraulic cylinder which pivots the intake housing 50 along with the take-up arrangement 20 fastened to it about the axis of rotation of the chopper drum 22. The hydraulic cylinder 48 is also used to adjust the height of the take-up arrangement 20 above the ground, or for the adjustment of the contact pressure of the support wheels 38 on the ground. The take-up arrangement 20 is also provided with a discharge conveyor 36 in the form of a screw conveyor that conveys the crop taken up from the sides of the take-up arrangement 20 to a central delivery opening, not shown, which is followed to the rear by the intake conveyor 42. The crop take-up arrangement 20 is also provided with a take-up rotor 34 that can be driven in rotation (as is the discharge conveyor 36) it is arranged underneath the discharge conveyor 36 and raises the crop from the ground with its tines in order to transfer it to the discharge conveyor 36. Moreover, a hold down 40 in the form of a sheet metal part arranged over the take-up rotor 34 is fastened to the housing 32.

In the following the indications of directions, such as at the side, below and above, refer to the forward operating direction V of the crop take-up arrangement 20, which is directed to the left in the figures.

Figure 2:
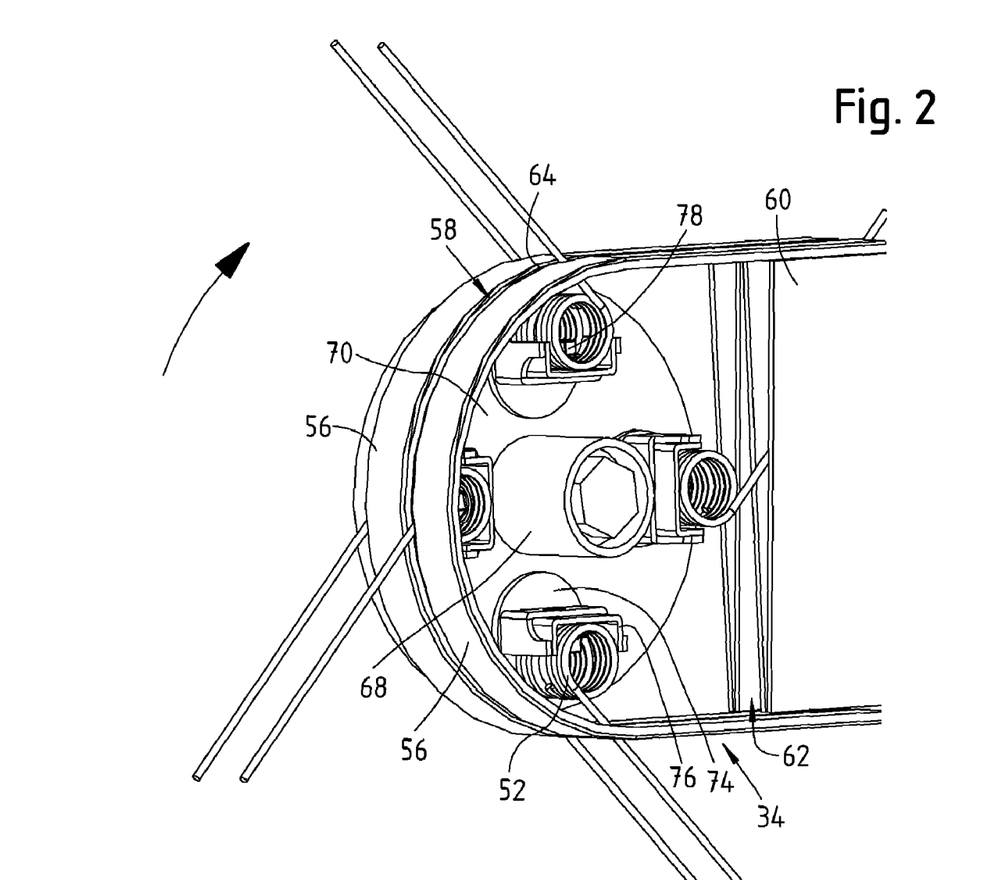
FIG. 2 shows a perspective view of a section of the housing of the take-up rotor of the take-up arrangement with the tines fastened to it.

The take up rotor 34, shown in greater detail in FIG. 2, includes a central, cylindrical shaft 68, that extends over the width of the crop take-up arrangement 20 and is supported in bearings at its ends, free to rotate, on the housing 3 of the crop take-up arrangement 20. Several circular retainers 70 are arranged coaxially to the shaft 68, distributed over the length of the shaft 68 and are fastened to the shaft 68, the retainers being provided with a multitude of bores distributed uniformly around the circumference of the shaft 68, the bores extending parallel to the shaft 68 and respectively containing bearing arrangements 74. Screws extend axially through the bearing arrangements 74, the threads of these screws engaging corresponding threads at the ends of U-shaped tine carriers 76 that extend parallel to the shaft 68. The tine carriers 76 are immobilized at the retainer 70, but are free to rotate about their longitudinal axes, by means of the screws and the bearing supports 74. Four tine carriers 76 are arranged at the retainer 70.

The tines 54 are fastened to the tine carriers 76, the tines are manufactured from resilient material and include a helical shaped section 52 that is connected by screws 78 to the tine carrier 76 and at whose ends sections extending outward are provided. The tines 54 extend through intervening spaces 58 that remain between the strippers 56 which are connected to the housing 32 and that are arranged to take up harvested crop and to convey it upwards and to the rear when the take-up arrangement 20 is moved across a field. For this purpose the shaft 68 is coupled to a drive shaft 80 (see FIG. 3) that is driven by the harvesting machine 10 and that brings it into rotation. The tine carriers 76 with the tines 54 are driven over the drive shaft 80, the retainer 70 that is connected with the drive shaft 80, fixed against rotation, the other retainer 70 connected over the shaft 68 to the drive shaft 80, and the bearing arrangements 74, so that they rotate about the longitudinal axis of the shaft 68.

In regard to a region located to the rear relative to the forward operating direction V of the take-up rotor 34, guide arrangements 60 are provided that are adjacent to the take-up rotor or to the strippers 56. These guide arrangements 60 are composed of a multitude of individual sheet metal guide plates that extend approximately vertically and in the forward operating direction, which form guide tracks 62 between them. The guide arrangements 60 are oriented in such a way that the guide tracks 62 are enclosed by the strippers 56 in such a way that they are narrowed in the direction of an upper, closed end region 64 of the intervening spaces 58 and in the direction of a lower, open end region 66 of the intervening spaces 58 they are widened. The guide arrangements 60 assist in the fact that the tines 54 are guided and enter into the intervening spaces 58 between the strippers 56 in case of a reversal of the take-up rotor 34, without any entanglement.

Figure 3:
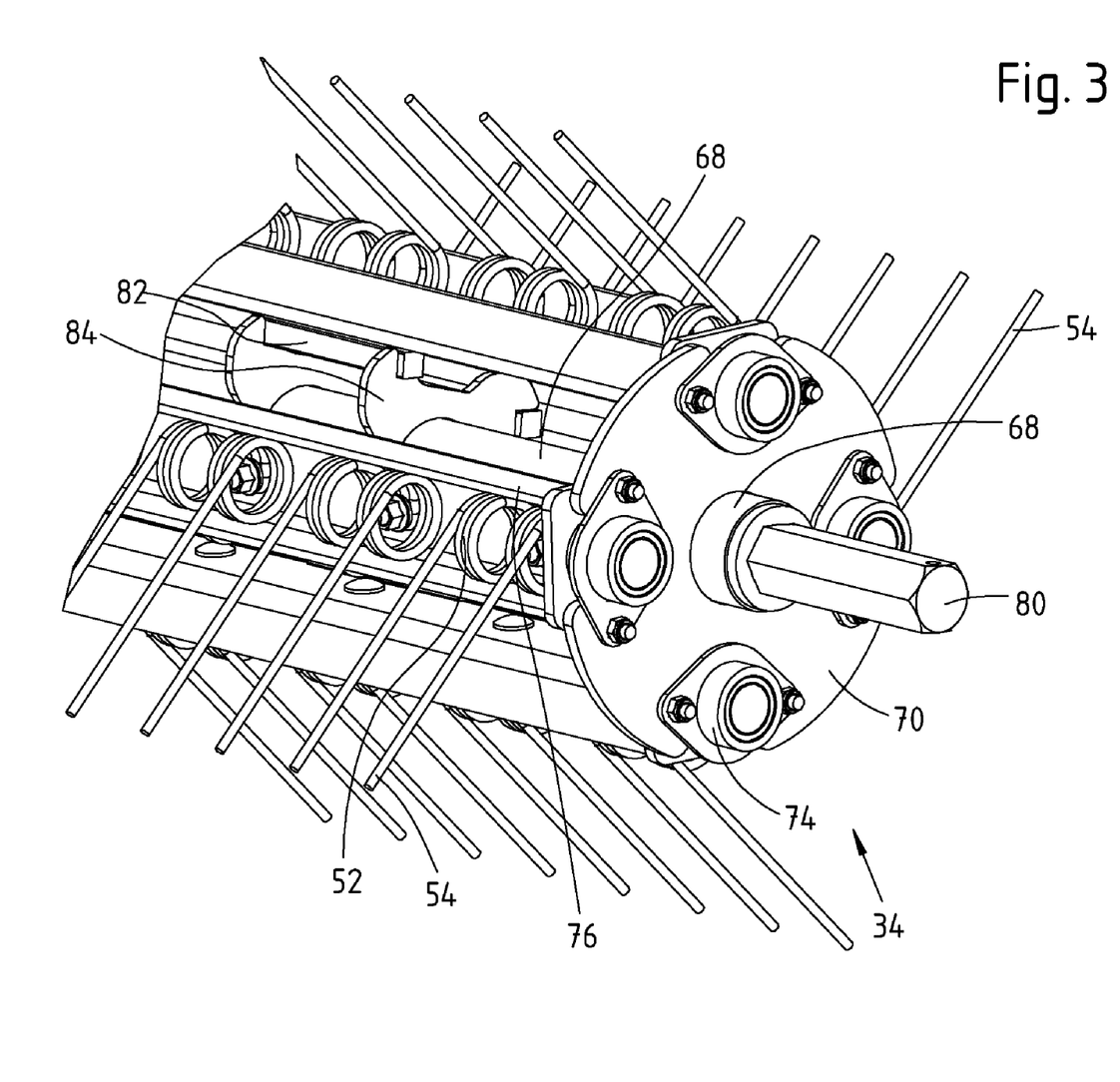
FIG. 3 shows a perspective view of a first embodiment of a take-up rotor.

Reference will now be made to FIG. 3, which shows a first embodiment of a take-up rotor 34 and in which it can be seen that the shaft 68 can be driven by means of the hexagonal drive shaft 80. Moreover, it can be seen that the tine carriers 76 can rotate freely about their longitudinal axes relative to the retainers 70 where the angle of rotation, however, is limited by stops 82 to an angle of approximately 90 degrees, that is, it is limited between two end positions. The stops 82 are attached to plates 84 that are concentric to the shaft 68 and located between the retainers 70, with the stops 82 and plates 84 cooperating to form a stop arrangement.

Figure 4:
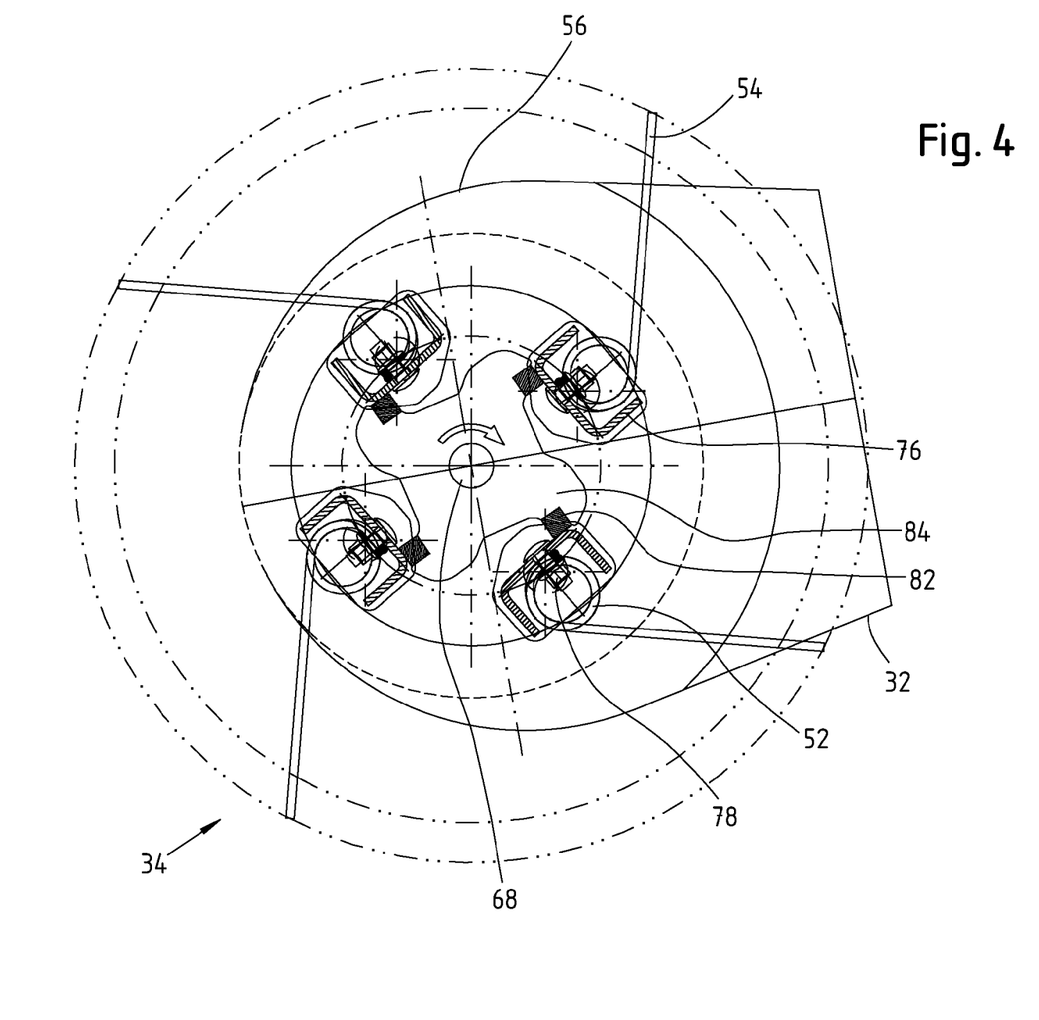
FIG. 4 shows a cross-sectional drawing of the take-up rotor in one direction of rotation.

In normal harvesting operation, the result is the situation shown in FIG. 4. The drive shaft 80 and the shaft 68 are driven in a first direction of rotation (here in the clockwise direction). On the basis of inertia forces and the effect of the harvested crop on the tines 54, the tine carriers 76 with the tines 54 rotate in a direction of rotation opposite to that of the shaft 68, in the counterclockwise direction, until the tine carriers 76 come into contact with their bases against the stops 82. The harvested crop is taken up without any problems, conveyed in an overshot manner and then deposited since the tines 54 are oriented at the upper, rear end of the elongated intervening spaces 58 approximately vertically to the areas of the strippers 56 at that location and slide the harvested crop to the rear to the discharge conveyor 36.

Figure 5:
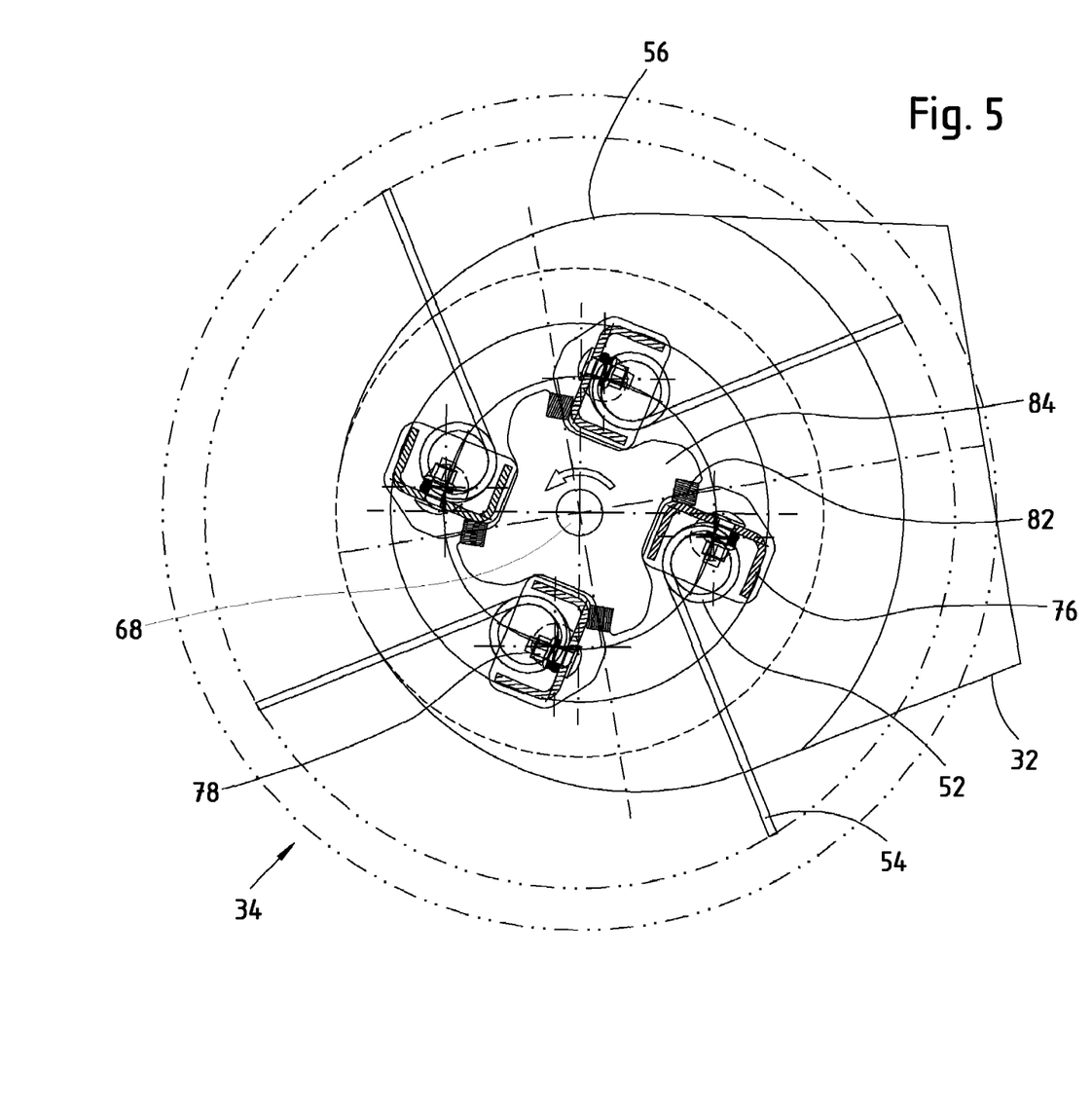
FIG. 5 shows a cross-sectional drawing of the take-up rotor in a second direction of rotation.

If the take-up rotor 34 of the take-up arrangement 20 is reversed, for example, after a jam or a verification of an intrusion of a foreign object, the result is a situation according to FIG. 5, in which the drive shaft 80 and the shaft 68 are driven in their second direction of rotation, in the counterclockwise direction. Also on the basis of inertia forces and the harvested crop interacting with the tines 54, the tine carriers 76 rotate in the opposite direction of the shaft 68, until they come into contact with the stops 82 with the other side of their bases from that of FIG. 4. In this position the reversal of the tines 54, particularly their problematic exit from the housing 32 can be accomplished without any difficulty, since the tines 54 are oriented during the second direction of rotation of the shaft 68 at the upper, rear end of the elongated intervening spaces 58 at least approximately parallel to the areas of the strippers 56 at that location. Moreover, the tines 54 are oriented approximately vertically to the strippers 56 at that location, at the lower, rear end of the elongated intervening spaces 58, which simplifies the entry of the tines 54 into the housing 32.

Figure 6:
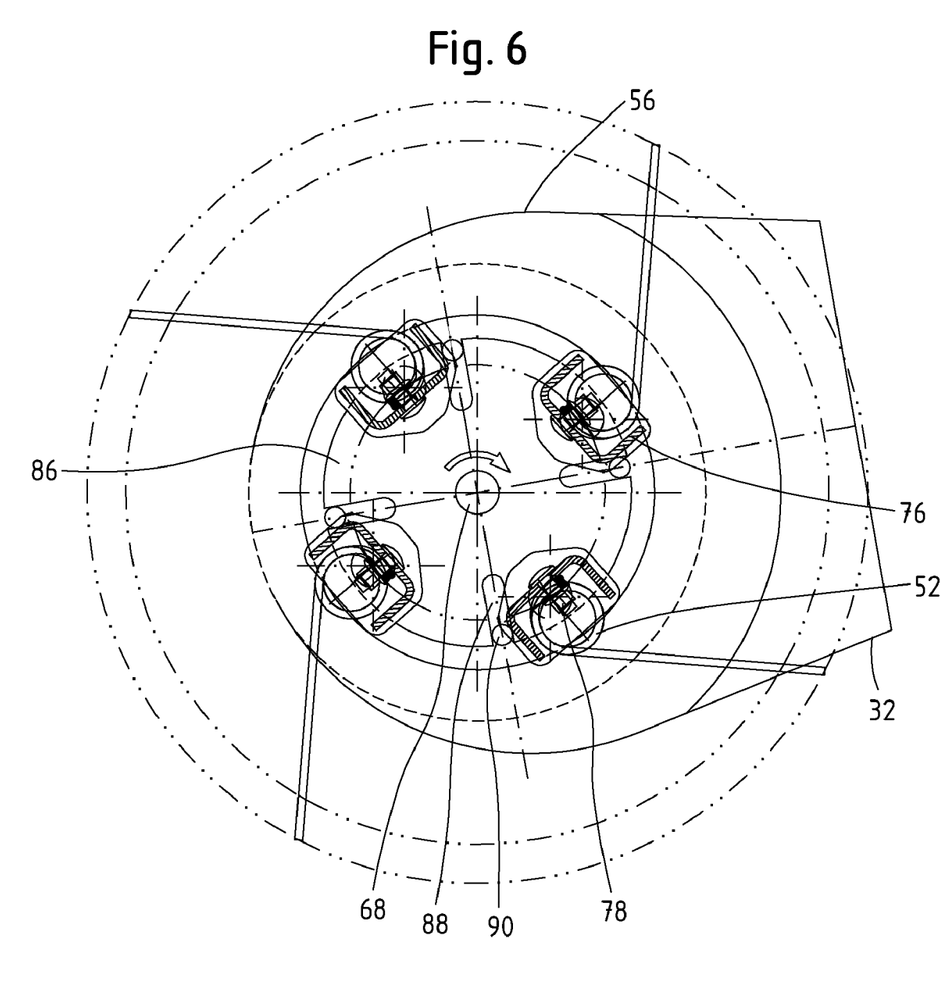
FIG. 6 shows a cross-sectional drawing of a second embodiment of a take-up rotor.
Figure 7:
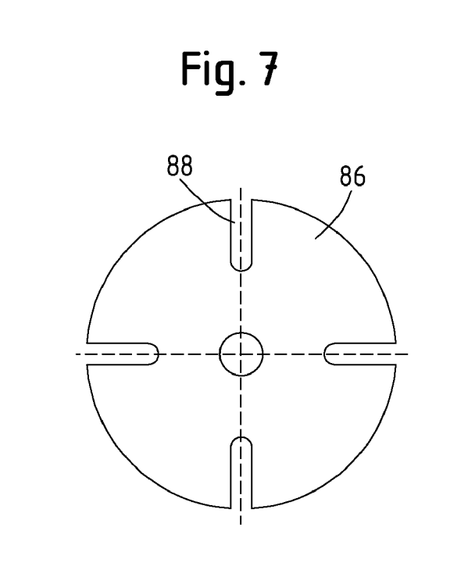
FIG. 7 shows a view of the coupling ring.

FIG. 6 shows a cross sectional view of a second embodiment of a take-up rotor 34. Elements that coincide with elements of the first embodiment are identified with the same part number call-outs. In a significant difference from the first embodiment the plates 84 and the stops 82 are omitted and are replaced by a coupling ring 86, that is arranged, free to rotate about the shaft 68. The coupling ring 86 is provided with four radial slots 88 into which pins 90 engage, these pins are connected to the tine carriers 76 and are provided with a longitudinal axis which extends parallel to the longitudinal axis of the tine carrier 76. The inner ends of the slots 88 in FIG. 6 limit the range of rotation of the tine carriers 76 in the clockwise direction, while the range of rotation of the tine carriers 76 in the counterclockwise direction can be limited by any desired other stops, for example, by stops attached to the retainers 70 (not shown) or by replacing the slots 88 with elongated holes. The function and the positions of the tine carriers 76 during the harvesting operation and during reverse operation correspond to those of the first embodiment, where, however, the rotational movement of the tine carrier 76 is transmitted by the coupling ring 86 among each other and thereby is synchronized.

Figure 8:
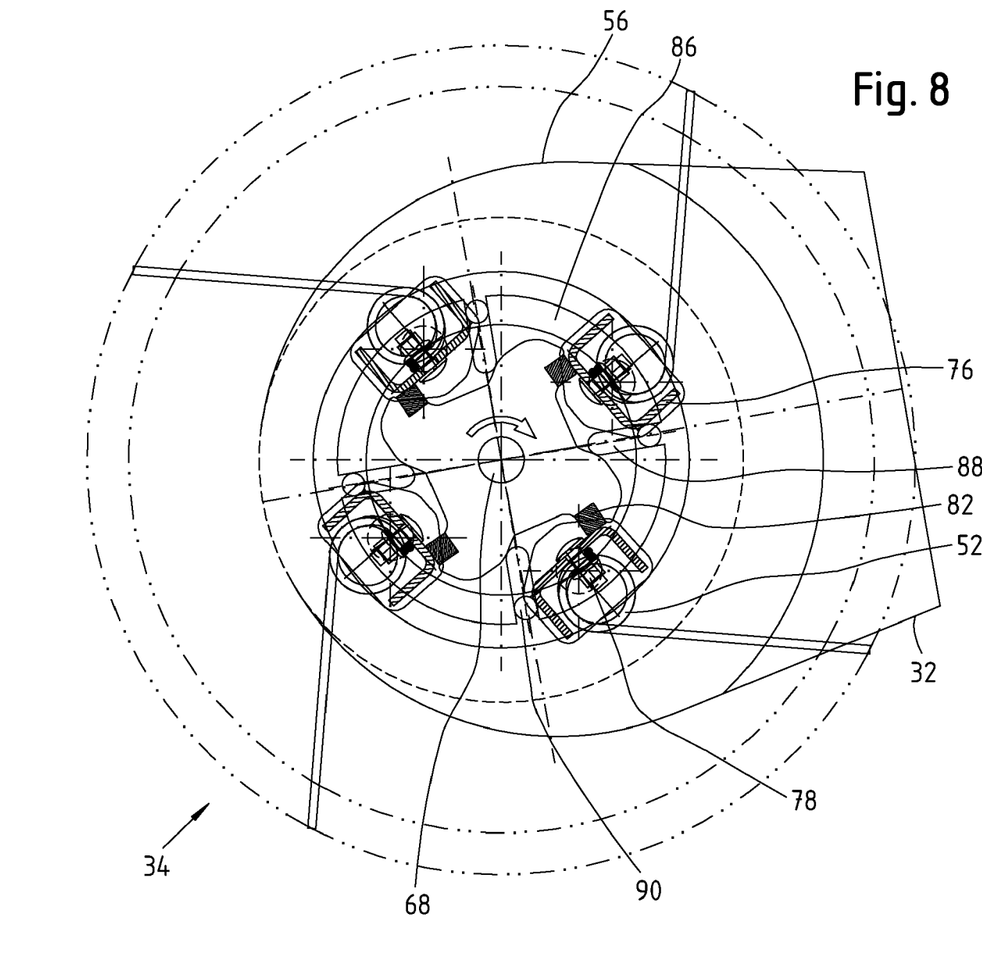
FIG. 8 shows a cross-sectional drawing of a third embodiment of a take-up rotor.

It should be noted that the first and the second embodiment could also be combined with each other, resulting in the third embodiment shown in FIG. 8. Then the stops 82 attached to the plates 84 of the first embodiment limit the rotational movement of the tine carriers 76, while the coupling ring 86 of the second embodiment, that was also provided, which can rotate freely and interacts with the pins 90, is used merely to synchronize the rotational movements of the tine carriers 76.

Moreover with the first embodiment it would be possible to drive only the retainers 70 with the drive shaft 80, while the shaft 68 can rotate freely relative to the retainers 70. Thereby the orientation of the tine carriers 76 would necessarily be predetermined by the direction of rotation of the retainers 70. Here the two retainers 70 at the ends of the tine carriers 76 could be connected to each other by a hollow shaft (not shown) or the plates 84 are supported in bearings on the shaft 68, free to rotate, this shaft then connects the two retainers 70 at the ends of the tine carriers 76 to each other.

Having described the preferred embodiment, it will become apparent that various modifications can be made without departing from the scope of the invention as defined in the accompanying claims.

The invention claimed is:

1. A crop take-up arrangement comprising:
a take-up rotor that includes a central shaft extending transversely to a direction of travel of the take-up arrangement, with said central shaft being adapted for being driven in forward and reverse directions of rotation;
at least two retainers spaced longitudinally from each other along, and being coupled for rotation with, said central shaft;
a plurality of elongate tine carriers extending parallel to, and being spaced equally from each other angularly about, said central shaft, with said tine carriers being supported from said at least two retainers, free to rotate about respective longitudinal pivot axes located equidistant from, and extending parallel to, said central shaft such that said tine carriers move along a circular path during rotation of said central shaft;
a plurality of resilient tines being mounted along a length of each of said tine carriers and having outwardly projecting sections extending away from an associated one of said tine carriers;
a housing enclosing said take-up rotor and including a plurality of transversely spaced strippers with elongated intervening spaces being defined between adjacent ones of said strippers and with outer parts of said outwardly projecting sections of the tines projecting through an associated intervening space over a part of a circular track described by a given tine during one rotation of said central shaft;
a drive shaft that can be driven in two directions of rotation being coupled to drive said central shaft so as to selectively drive the tine carriers in said forward and reverse directions of rotation around the circular path; and a stop arrangement mounted for rotation with said central shaft and being so located relative to said plurality of tine carriers that the tine carriers can be freely pivoted about their respective longitudinal axes between first and second end positions separated angularly from each other by approximately 90° and in which the carriers are engaged with said stop arrangement and can be moved between the first and second end positions by crop forces imposed on said tines, with crop force directions being a function of the direction of rotation of the drive shaft.

2. The crop take-up arrangement according to claim 1, wherein axially aligned bearings are provided on the at least two retainers, with the tine carriers being supported in said bearings on the retainers, free to rotate; and, said stop arrangement including at least one stop associated with each tine carrier.

3. The crop take-up arrangement according to claim 2, wherein said stop arrangement includes a pair of plates located between said retainers and being secured to said central shaft a longitudinally spaced locations, and includes four stops each comprising a bar extending between said pair of plates in parallel relationship to each other and to said central shaft, with each stop being associated with a respective one of said plurality of carriers.

4. The crop take-up arrangement according to claim 1, wherein the take-up rotor conveys in an overshot manner in the working direction of rotation of the drive shaft, with the tines being oriented approximately vertically to a first area of the strippers at a first location at upper, rear end of the elongated intervening spaces, and the tines being oriented approximately vertically to a second area of the strippers at a second location at a lower, rear end of the elongated intervening spaces during the reverse direction of rotation of the drive shaft.

5. A crop take-up arrangement, comprising:

a take-up rotor that includes a central shaft extending transversely to a direction of travel of the take-up arrangement;

at least two retainers spaced longitudinally from each other along, and being coupled to said central shaft;

a plurality of elongate tine carriers extending parallel to, and being arranged angularly about, said central shaft at locations spaced equally from each other, each said carrier being mounted to said at least two retainers for pivoting about a pivot axis extending parallel to said central shaft;

a coupling ring being mounted on said central shaft for rotating freely about said central shaft at a location between said at least two retainers, with said coupling ring connecting said tine carriers to each other such that the the pivotal movement of the tine carriers about their respective pivot axis is caused to occur in concert.

6. The crop take-up arrangement according to claim 5, wherein the coupling ring defines at least one end position of the pivotal movement of each tine carrier about said pivot axis.

7. The crop take-up arrangement according to claim 5, wherein said coupling ring is defined by a circular plate containing one of a plurality of slots or elongated holes respectively being equal in number to, and having an angular arrangement similar to said plurality of carriers; and each of said tine carriers being provided with a longitudinal axis extending parallel to the pivot axis of the tine carrier to which the pin is fixed, with the pin being engaged with one of said plurality of slots or elongated engages of the coupling ring.

* * * * *